(12) United States Patent
Linke et al.

(10) Patent No.: US 9,636,864 B2
(45) Date of Patent: May 2, 2017

(54) DEVICE FOR HOLDING WORKPIECES

(75) Inventors: Michael Linke, Hamburg (DE); Dieter Klatt, Hamburg (DE); Rolf Baumgarte, Ahrensburg (DE)

(73) Assignee: KHS Corpoplast GmbH, Hamburg (DE)

( * ) Notice: Subject to any disclaimer, the term of this patent is extended or adjusted under 35 U.S.C. 154(b) by 329 days.

(21) Appl. No.: 14/351,850

(22) PCT Filed: May 11, 2012

(86) PCT No.: PCT/EP2012/002049
§ 371 (c)(1),
(2), (4) Date: Apr. 14, 2014

(87) PCT Pub. No.: WO2013/056753
PCT Pub. Date: Apr. 25, 2013

(65) Prior Publication Data
US 2014/0291909 A1    Oct. 2, 2014

(30) Foreign Application Priority Data
Oct. 21, 2011   (DE) .......................... 10 2011 116 883

(51) Int. Cl.
*B65G 47/86*   (2006.01)
*B29C 49/42*   (2006.01)
(Continued)

(52) U.S. Cl.
CPC ....... *B29C 49/4205* (2013.01); *B25J 15/0028* (2013.01); *B25J 15/0038* (2013.01);
(Continued)

(58) Field of Classification Search
CPC  B25B 5/006; B25B 5/003; B25B 1/24; C23C 14/50; B29C 49/4205; B29C 49/421; B65G 47/847
(Continued)

(56) References Cited

U.S. PATENT DOCUMENTS 3,590,982 A * 7/1971 Banyas ................ B65G 47/842
                                                           198/470.1
3,908,813 A * 9/1975 Bertonelli ............ A23N 15/001
                                                           198/470.1
(Continued)

FOREIGN PATENT DOCUMENTS

CN            1695925 A      11/2005
CN          100503211 C       6/2009
(Continued)

*Primary Examiner* — Larry E Waggle, Jr.
*Assistant Examiner* — Tyrone V Hall, Jr.
(74) *Attorney, Agent, or Firm* — Rankin, Hill & Clark LLP (57) ABSTRACT

The device used to hold workpieces is designed in a manner of tongs and is provided with two tong arms (45, 46). The tong arms are held by a tong base (47) and can be arranged at least in an open position and in a closed position. The tong base is held by a base element (48). The tong base is arranged on a transfer wheel, an opening movement of the tong arms being carried out by means of a movement component transverse to a radial direction of the transfer wheel. The first tong arm (45) extends on both sides of a central line of the tong base at least in some regions, said central line being oriented in a radial direction of the transfer wheel. A workpiece holding recess, which is spanned by the tong arms at least in some regions, is delimited by the second tong arm (46) only in a holding recess (68) region arranged on the outside in a radial direction of the transfer wheel relative to a holding recess transverse central line that runs transverse to the central line of the tong base.

7 Claims, 7 Drawing Sheets

(51) Int. Cl.
  *B25J 15/00* (2006.01)
  *B29K 23/00* (2006.01)
  *B29K 67/00* (2006.01)
  *B29C 49/06* (2006.01)
  *B29C 49/12* (2006.01)
  *B29C 49/36* (2006.01)
  *B29C 49/48* (2006.01)

(52) U.S. Cl.
  CPC ............ *B65G 47/847* (2013.01); *B29C 49/06* (2013.01); *B29C 49/12* (2013.01); *B29C 49/36* (2013.01); *B29C 2049/4889* (2013.01); *B29K 2023/12* (2013.01); *B29K 2067/003* (2013.01)

(58) Field of Classification Search
  USPC ................. 269/55–57; 294/104, 90; 425/526
  See application file for complete search history.

(56) References Cited

U.S. PATENT DOCUMENTS

| | | | |
|---|---|---|---|
| 4,076,071 A | 2/1978 | Rosenkranz et al. | |
| 4,116,609 A | 9/1978 | Obsomer et al. | |
| 4,313,720 A | 2/1982 | Spurr | |
| 5,346,386 A | 9/1994 | Albrecht et al. | |
| 5,575,379 A * | 11/1996 | Schmetzer | B65H 29/003 198/803.7 |
| 5,648,026 A | 7/1997 | Weiss | |
| 5,893,700 A * | 4/1999 | Kronseder | B08B 9/426 198/803.9 |
| 6,302,172 B1 * | 10/2001 | De Villele | B67C 3/242 141/372 |
| 6,354,427 B1 * | 3/2002 | Pickel | A23L 3/001 198/470.1 |
| 6,513,643 B2 * | 2/2003 | Nakada | B07C 5/122 198/379 |
| 6,612,634 B1 * | 9/2003 | Zoppas | B25J 15/0206 294/106 |
| 6,692,050 B2 * | 2/2004 | Graffin | B65G 29/00 198/803.7 |
| 6,959,953 B2 * | 11/2005 | Graffin | B67C 3/242 198/470.1 |
| 7,784,603 B2 * | 8/2010 | Burgmeier | B65G 47/90 198/468.5 |
| 8,002,107 B2 * | 8/2011 | Balzarin | B65G 29/00 198/470.1 |
| 8,191,948 B2 * | 6/2012 | Preti | B65G 47/847 294/106 |
| 8,206,144 B2 * | 6/2012 | Ng | B29C 49/4205 198/803.4 |
| 8,307,977 B2 * | 11/2012 | Nguyen | B65G 47/71 198/470.1 |
| 8,439,413 B2 * | 5/2013 | Cirio | B67C 3/242 198/803.7 |
| 8,556,317 B2 * | 10/2013 | Bodtlander | B65G 47/90 198/803.7 |
| 2010/0200367 A1 | 8/2010 | Nguyen et al. | |
| 2012/0223468 A1 * | 9/2012 | Baumgarte | B29C 49/4205 269/55 |

FOREIGN PATENT DOCUMENTS

| | | |
|---|---|---|
| DE | 2352926 A | 4/1975 |
| DE | 4212583 A1 | 10/1993 |
| DE | 4340291 A1 | 6/1995 |
| DE | 29901545 U1 | 6/1999 |
| DE | 19906438 A1 | 8/2000 |
| DE | 10017050 A1 | 10/2001 |
| DE | 10035572 A1 | 1/2002 |
| DE | 20203781 U1 | 8/2003 |
| DE | 102007054388 A1 | 5/2009 |
| DE | 102009051656 A1 | 5/2011 |
| EP | 1930259 A1 | 6/2008 |
| WO | 01/76850 A1 | 10/2001 |

* cited by examiner

DEVICE FOR HOLDING WORKPIECES

The invention pertains to a device for holding workpieces, being fashioned as a tongs and being provided with at least a first and a second tong arm, and wherein the tong arms are held by a tong base and can be arranged at least in an open position and in a closed position, and the tong base is arranged on a transfer wheel, an opening movement of the tong arms being carried out by means of a movement component transverse to a radial direction of the transfer wheel.

The invention furthermore pertains to a device for the blow molding of containers, having at least one blowing station with a blow mold and at least one carrier element for the positioning of preforms along a transport path. It can be provided here that the carrier element is held by a rotating transfer wheel, relative to which the carrier element is movably mounted, and that a cam control is used for the carrier element.

When molding containers by the action of blowing pressure, preforms of a thermoplastic material, such as preforms made of PET (polyethylene terephthalate), are taken to various processing stations within a blowing machine. Typically, such a blowing machine has a heating mechanism as well as a blowing mechanism, where the previously temperature-conditioned preform is expanded by biaxial orientation into a container. The expansion is done by means of pressurized air, which is introduced into the preform being expanded. The process sequence of such an expansion of the preform is explained in DE-OS 43 40 291. The aforementioned introduction of the gas under pressure also involves the introduction of the pressurized gas into the developing container base and the introduction of pressurized gas into the preform at the start of the blowing process.

The basic layout of a blowing station for molding of containers is described in DE-OS 42 12 583. Possibilities for temperature conditioning of the preforms are explained in DE-OS 23 52 926.

Within the blow molding device, the preforms as well as the blow-molded containers can be transported by means of various handling mechanisms. In particular, the use of transport mandrels onto which the preforms are shoved has proven to work well. But the preforms can also be handled with other transport mechanisms. The use of gripping tongs for the handling of preforms and the use of spreading mandrels, which can be introduced into a mouth region of the preforms for the holding process, likewise belong to the available designs.

A handling of containers by use of transfer wheels is described, for example, in DE-OS 199 06 438 for an arrangement of the transfer wheel between a blowing wheel and an output section.

The above-explained handling of the preforms occurs on the one hand in the so-called two-stage process, wherein the preforms are first produced in an injection molding process, then placed in intermediate storage, and only afterwards conditioned in regard to their temperature and blow-molded into a container. On the other hand, there is an application in the so-called one-stage process, wherein the preforms are suitably tempered immediately after being produced by injection molding and after having hardened suitably and then they are blow molded.

In regard to the blowing stations used, different embodiments are known. In the case of blowing stations that are arranged on rotating transport wheels, one often finds the mold carriers folding open like a book. But it is also possible to use mold carriers that can move relative to each other or that are otherwise guided. In stationary blowing stations, which are especially suited to having several cavities for the container molding process, plates arranged in parallel to each other are typically used as the mold carriers.

For the handling of the preforms and for the handling of the blow-molded containers, so-called transfer wheels are often used within the blowing machine, being outfitted with carrier elements for the preforms or bottles. The carrier elements can either directly engage with the preforms or bottles, or they can move separate transport elements which in turn hold the preforms or bottles directly. To assist the transport processes, the carrier elements are typically mounted so that they can swivel relative to the transfer wheel. In addition, a telescoping function is also often realized. Cam controls are used to dictate the position of the carrier elements. For this, the carrier elements are moved past firmly situated cams by means of cam rollers.

One problem with the use of such transfer wheels outfitted with carrier elements is to avoid severe damage when mechanical faults occur, especially when collisions occur. For this, it is known how to mount the carrier arms by using overload couplings in the area of the transfer wheels. Such overload couplings on the one hand are costly and what is more they increase the structural weight of the rotating transfer wheels.

It is also already known how to outfit the carrier arms with active positioning elements that pneumatically or electrically command an extending or retracting of the carrier arms so that they are arranged in a working position or a rest position. However, such positioning mechanisms cause relative high expense and increase the structural weight of the transfer wheel, so that increased inertial properties occur.

A tong-like holding element is already described in DE 10 2007 054 388, which is held in the area of a carrier and able to swivel out under the action of an excessive load, however the corresponding design in view of the many structural elements needed has proven to be costly and thus only partly suitable for use in large production runs.

Another problem with the use of conventional tong-like holding elements is that an unwanted opening of the tongs cannot be ruled out when transverse forces are acting on the workpiece being held. But a brief opening of the tongs can result in a loss of the workpiece and thus disruptions of the production sequence.

In one application of tong-like holding elements according to the prior art for the production of blow-molded containers the problem occurs in certain production sequences that the containers stick to one of the mold halves when the blow molds are opened. Such a sticking can lead to the aforementioned unwanted opening of the tongs. Although it is conceivable to mechanically block the opening of the tongs or their swiveling during such process periods, this is undesirable, since one cannot rule out the further occurrence of mechanical disruptions during which the ability to swivel or open would be needed to avoid damage to the machine.

The problem of the present invention is to design a device of the aforementioned kind such that high operating reliability is supported with a simple structural layout.

This problem is solved according to the invention in that the first tong arm extends at least in some regions on both sides of a central line of the tong base oriented in a radial direction of the transfer wheel, and a workpiece holding recess which is spanned by the tong arms at least in some regions is delimited by the second tong arm only in a holding recess region arranged on the outside in a radial direction of the transfer wheel relative to a holding recess transverse central line that runs transverse to the central line of the tong base.

Conventional tong arms delimit the holding recess symmetrically on the left and right of a radial central line. Forces acting transverse to the radial direction and transmitted to the tong arms by the workpiece therefore result in a force loading of the individual tong arms and can lead to an opening of the tongs. The extending of the first tong arm beyond the radial central line according to the invention means that corresponding transverse forces in a predetermined region only act on the first tong arm and thus do not result in an unwanted opening movement.

In particular, the shifting of the region in which the holding opening is bounded by the second tong into the region situated on the outside in a radial direction relative to the transverse central line means that force loading transverse to the radial direction or pointing inward at a slant to the transfer wheel in regard to the radial direction cannot bring about the unwanted opening movements.

Sample embodiments of the invention are shown schematically in the drawings. There are shown:

FIG. 1, a perspective representation of a blowing station for the production of containers from preforms, FIG. 2, a longitudinal section through a blow mold, in which a preform is being stretched and expanded, FIG. 3, a sketch to illustrate a basic layout of a device for the blow molding of containers, FIG. 4, a modified heating section with boosted heating capacity, FIG. 5, a perspective representation of a transfer wheel with a plurality of positionable carrier arms, FIG. 6, a perspective representation of a tong-like holding element in a closed state of the tongs, FIG. 7, a perspective representation of the arrangement per FIG. 6, looking in a direction downward at a slant with slight modifications in the insertion region of the second tong arm, FIG. 8, the tongs per FIG. 6 in a top view and a closed state, FIG. 9, the tongs of FIG. 8 in an open state.

Figure 1:
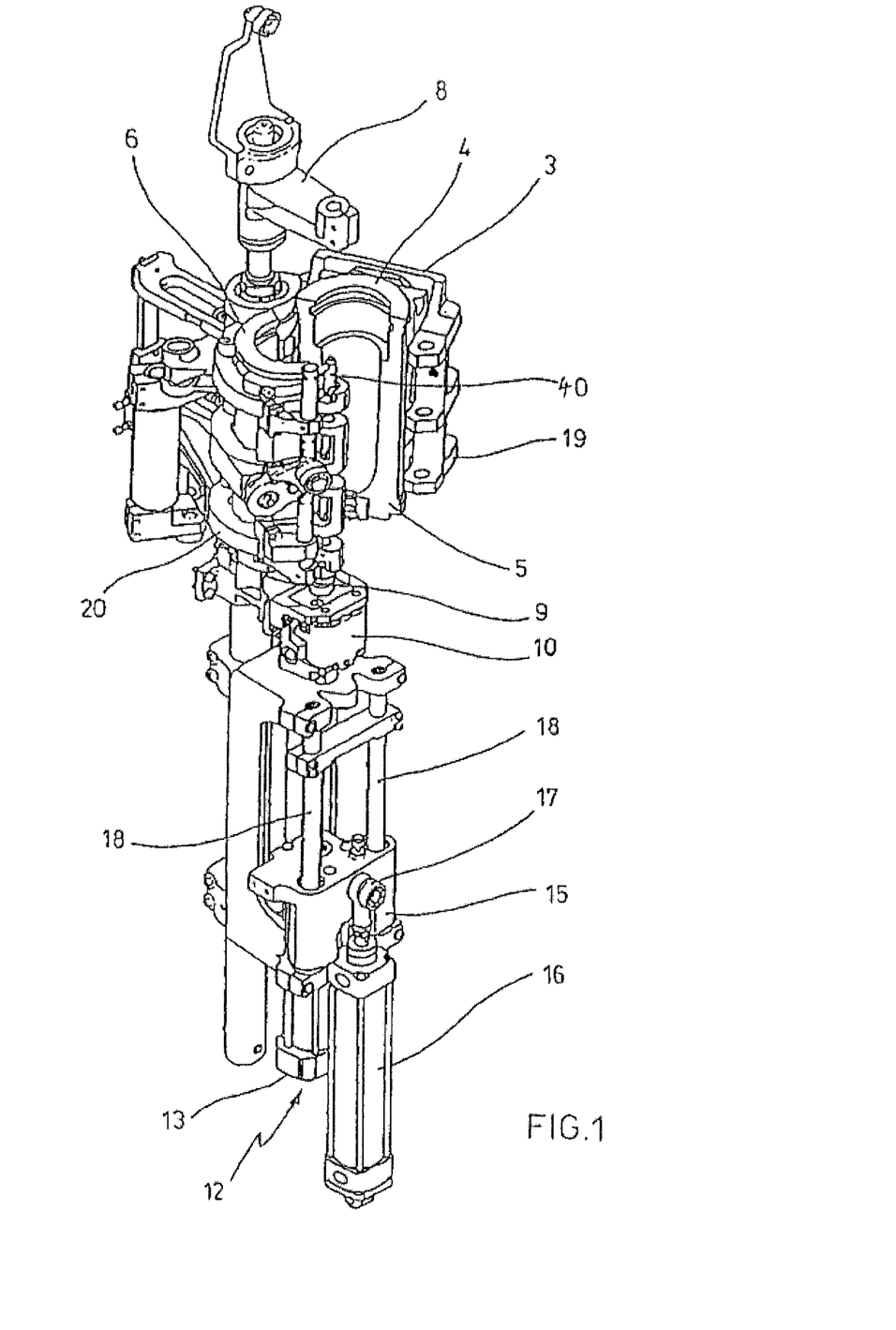
Figure 2:
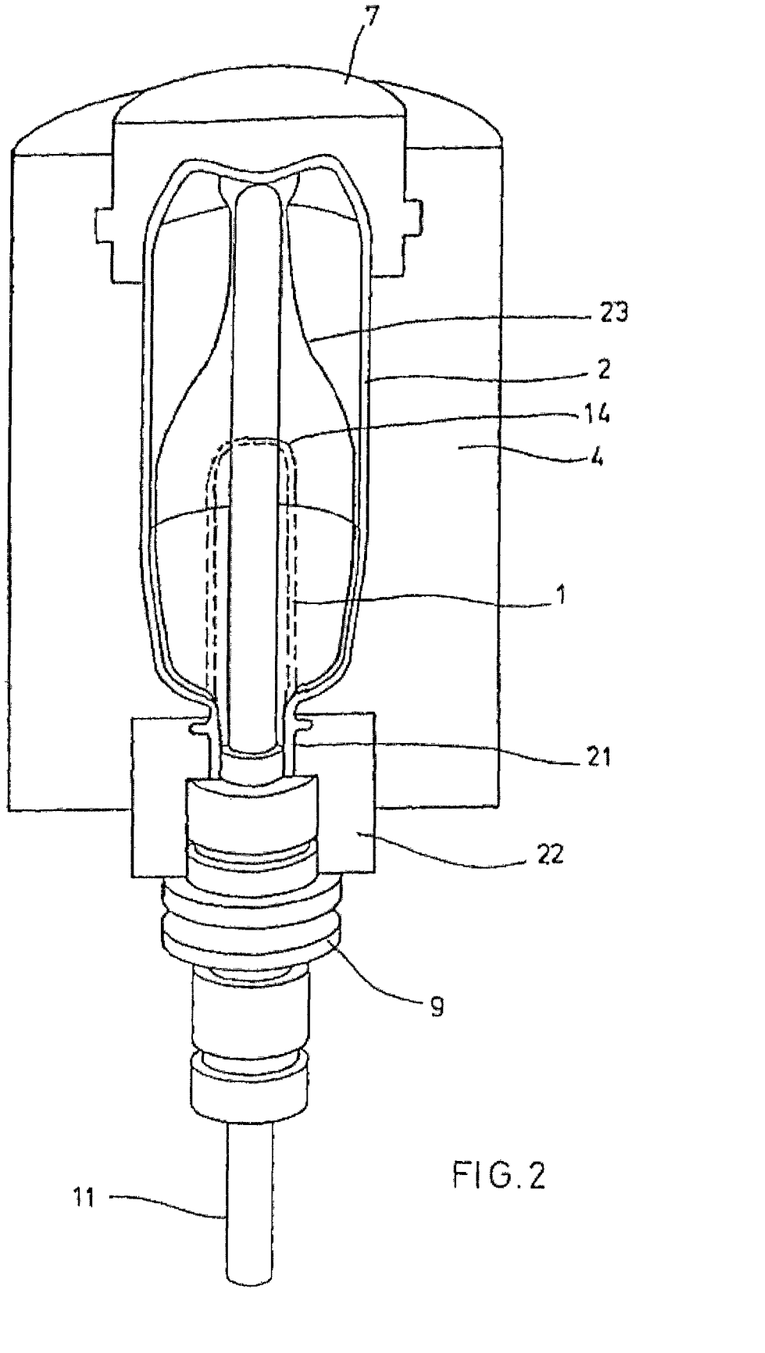

The basic layout of a device for the shaping of preforms (1) into containers (2) is represented in FIG. 1 and FIG. 2.

The device for the molding of the container (2) essentially consists of a blowing station (3), which is provided with a blowing mold (4) in which a preform (1) can be inserted. The preform (1) can be an injection molded part of polyethylene terephthalate. To enable the inserting of the preform (1) into the blow mold (4) and to enable a removal of the finished container (2), the blow mold (4) consists of mold halves (5, 6) and a bottom part (7), which can be positioned by a lifting device (8). The preform (1) can be held by a transport mandrel (9) in the region of the blowing station (3), which together with the preform (1) moves through a plurality of processing stations within the device. But it is also possible to insert the preform (1) directly into the blow mold (4), for example, by means of tongs or some other handling means.

To enable a supply of pressurized air, underneath the transport mandrel (9) is arranged a connection piston (10), which supplies pressurized air to the preform (1) and at the same time provides a sealing relative to the transport mandrel (9). In a modified design, however, it is essentially conceivable to also use fixed pressurized air supply lines.

In this sample embodiment, a stretching of the preform (1) is accomplished by means of a stretching rod (11), which is positioned by a cylinder (12). According to another embodiment, a mechanical positioning of the stretching rod (11) is done by cam segments which are operated by pickup rollers. The use of cam segments is especially advisable when a plurality of blowing stations (3) are arranged on a single rotating blow wheel.

In the embodiment represented in FIG. 1, the stretching system is configured so that a tandem arrangement of two cylinders (12) is provided. By a primary cylinder (13), the stretching rod (11) is at first moved into the region of a bottom (14) of the preform (1) before the start of the actual stretching process. During the actual stretching process, the primary cylinder (13) with extended stretching rod is positioned together with a carriage (15) carrying the primary cylinder (13) by means of a secondary cylinder (16) or by means of a cam control system. In particular, it is intended to use the secondary cylinder (16) under cam control so that a current stretching position is dictated by a guide roller (17), which slides along a cam path during the stretching process. The guide roller (17) is pressed by the secondary cylinder (16) against the guide path. The carriage (15) slides along two guide elements (18).

After a closing of the mold halves (5, 6) situated in the region of carriers (19, 20), there occurs a locking of the carriers (19, 20) relative to each other with the aid of a locking mechanism (20).

In order to adapt to different shapes of a mouth segment (21) of the preform (1), the use of separate threaded inserts (22) in the region of the blow mold (4) is envisioned, according to FIG. 2.

FIG. 2 shows, in addition to the blow-molded container (2), also the preform (1) indicated by broken lines and a developing container bubble (23), schematically.

Figure 3:
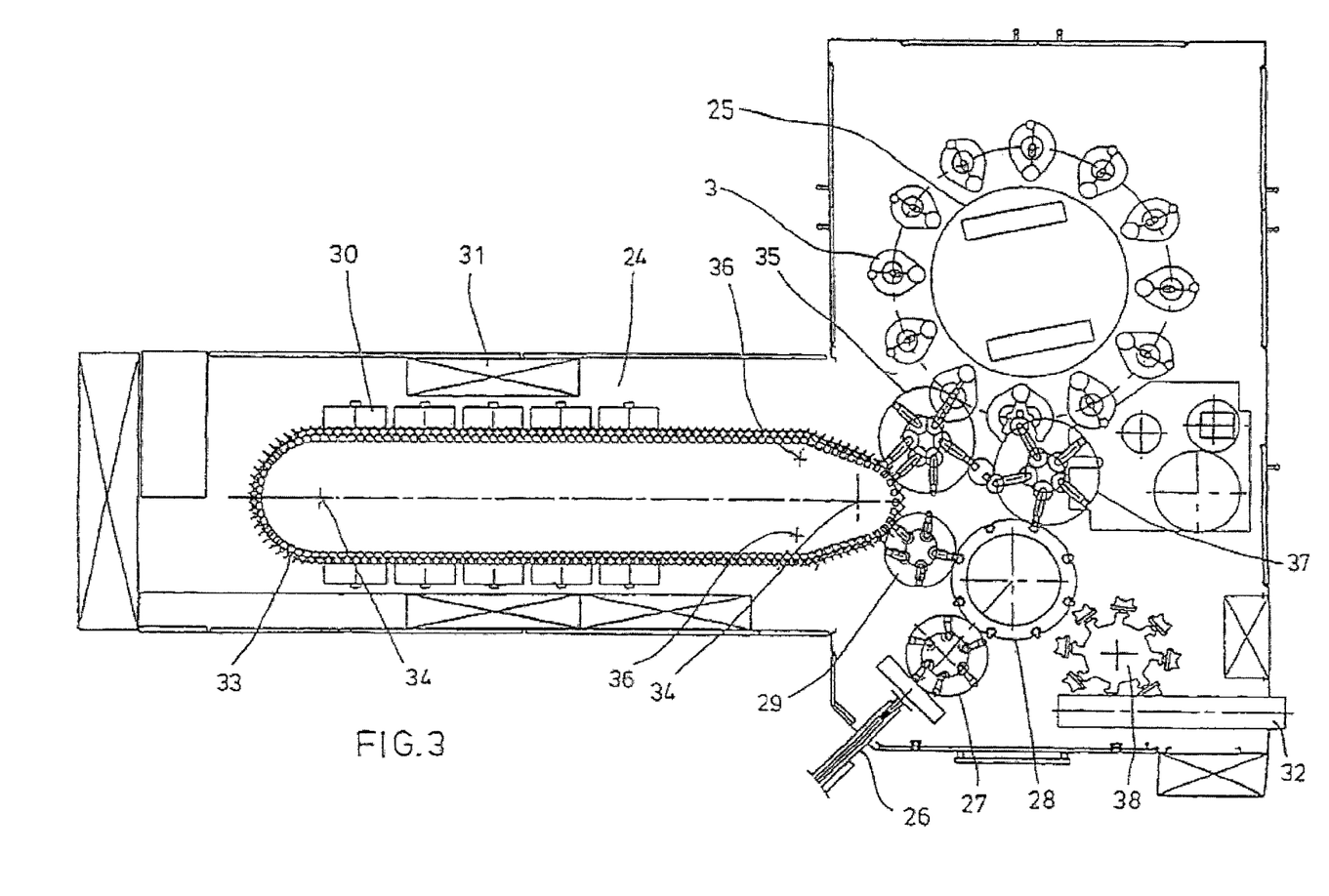

FIG. 3 shows the basic layout of a blowing machine, being provided with a heating section (24) and a rotating blow wheel (25). Starting from a preform feed (26), the preforms (1) are transported by transfer wheels (27, 28, 29) into the region of the heating section (24). Along the heating section (24), radiant heaters (30) and blower (31) are arranged, in order to temper the preforms (1). After a sufficient tempering of the preforms (1), they are passed off to the blow wheel (25), in the vicinity of which the blowing stations (3) are arranged. The finished blow-molded containers (2) are taken by additional transfer wheels to an output section (32).

In order to shape a preform (1) into a container (2) such that the container (2) has material properties which ensure a long shelf life of foods placed inside the container (2), especially beverages, special process steps have to be taken during the heating and orienting of the preforms (1). Furthermore, beneficial effects can be accomplished by obeying special dimensioning rules.

As the thermoplastic material, various plastics can be used. For example, PET, PEN or PP are usable.

The expansion of the preform (1) during the orienting process occurs by supply of pressurized air. The supply of pressurized air is divided into a preliminary blowing phase, in which gas such as pressurized air is supplied with a low pressure level, and a subsequent main blowing phase, in which gas is supplied with a higher pressure level. During the preliminary blowing phase, pressurized air with a pressure in the interval of 10 bar to 25 bar is typically used, and during the main blowing phase pressurized air with a pressure in the interval of 25 bar to 40 bar is supplied.

One also notices from FIG. 3 that the heating section (24) in the embodiment shown is formed from a plurality of circulating transport elements (33), which are arranged in a row in the manner of a chain and moved along diversion wheels (34). In particular, it is envisioned that the chain arrangement spans an essentially rectangular plan contour. In the embodiment shown, a single relatively large-dimensioned diversion wheel (34) is used in the region of the extension of the heating section (24) facing the transfer wheel (29) and an input wheel (35) and two relatively small-dimensioned diversion wheels (36) in the region of neighboring deflections. But any other desired system of guidance is also essentially conceivable.

To enable the closest possible spacing of the transfer wheel (29) and the input wheel (35) relative to each other, the depicted arrangement proves to be particularly suitable, since three diversion wheels (34, 36) are positioned in the region of the corresponding extension of the heating section (24), and each time the smaller diversion wheels (36) are in the region of the transition to the linear runs of the heating section (24) and the larger diversion wheel (34) is in the immediate transfer region to the transfer wheel (29) and to the input wheel (35). Alternatively to the use of chainlike transport elements (33) it is also possible to use a rotating heating wheel, for example.

After the blow molding of the container (2) is finished, it is taken out from the area of the blowing station (3) by a removal wheel (37) and transported via the transfer wheel (28) and an output wheel (38) to the output section (32).

Figure 4:
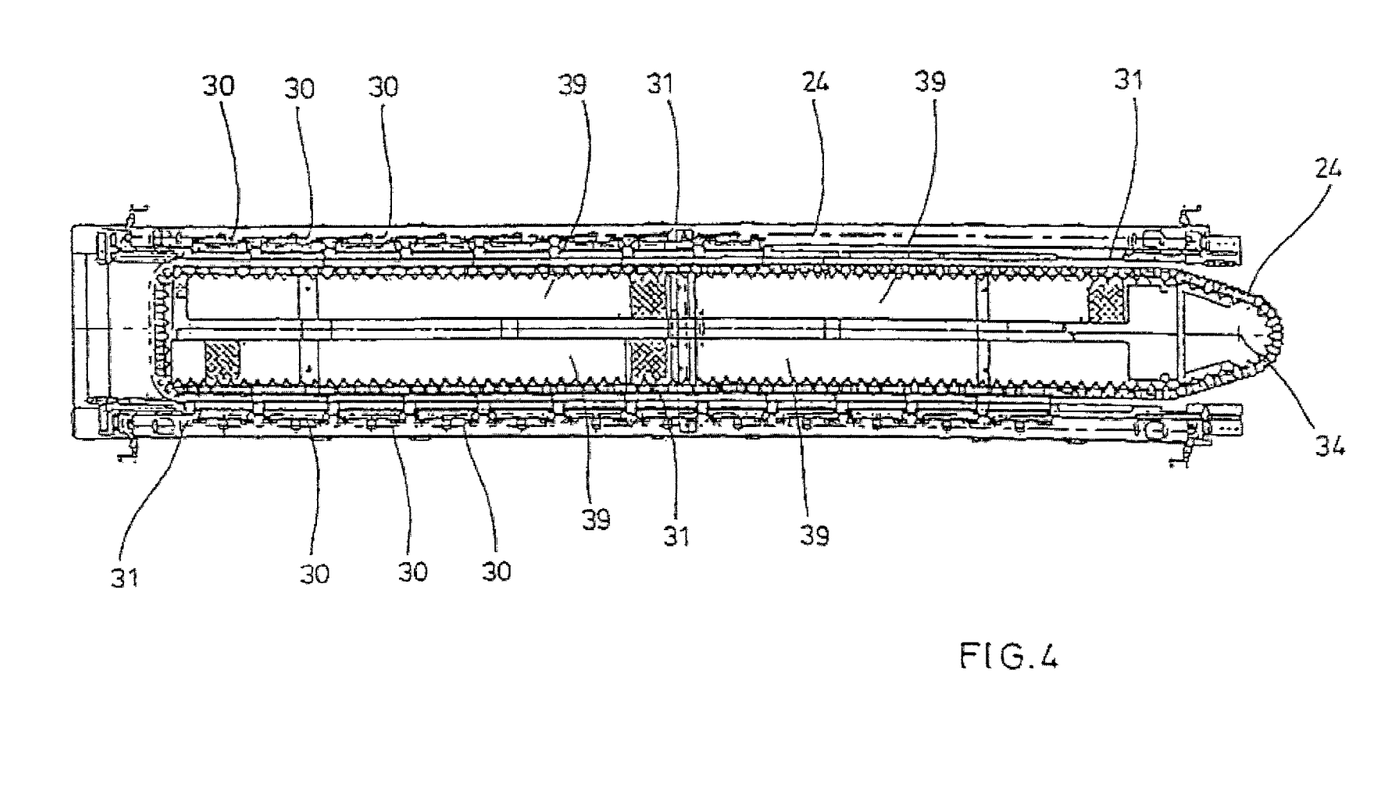

In the modified heating section (24) shown in FIG. 4, thanks to the larger number of radiant heaters (30), a larger number of preforms (1) can be tempered per unit of time.

The blowers (31) here introduce cold air into the region of cold air channels (39), each of them being situated opposite the corresponding radiant heaters (30) and putting out the cold air via outflow openings. The arrangement of the outflow openings realizes a flow direction of the cold air essentially transverse to a transport direction of the preforms (1). The cold air channels (39) can provide reflectors for the thermal radiation in the area of surfaces lying opposite the radiant heaters (30), and it is also possible to accomplish a cooling of the radiant heaters (30) by the cold air which is put out.

Figure 5:
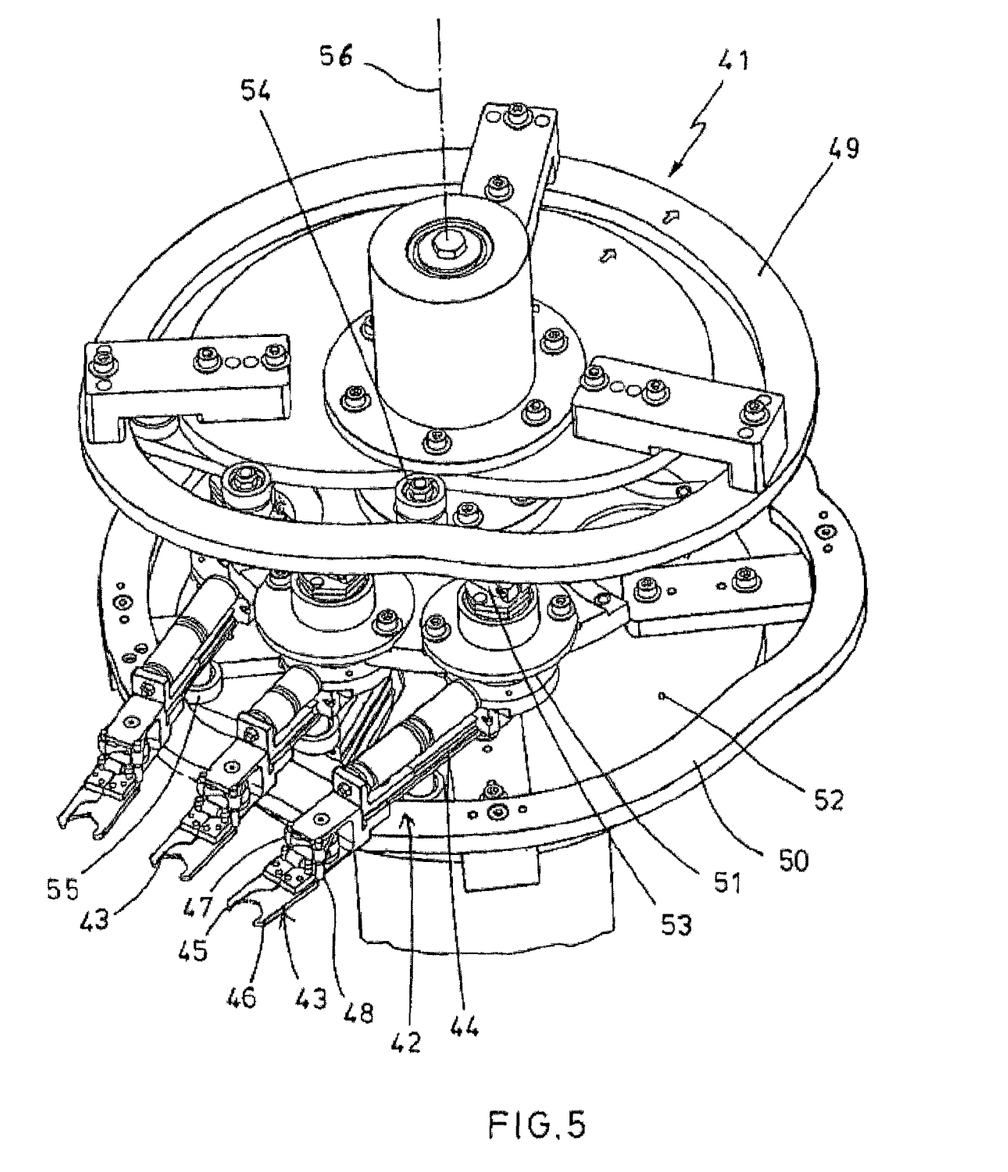

FIG. 5 shows a transfer wheel (41) which can be installed, for example, in the positions for at least one of the transfer wheels (27, 28, 29). The transfer wheel (41) is provided with carrier elements (42), which serve for the handling of preforms (1) and/or containers (2). In the sample embodiment shown, the carrier element (42) is formed from a handling element (43) and a carrier arm (44). The handling element (43) is tong-like in the sample embodiment shown and has two tong arms (45, 46), which are movable and held by a tong base (47). The tong base (47) can be locked in or screwed together with a base element (48) which is held by the carrier arm (44). Such handling elements (43) grab the preforms (1) or containers (2) directly. But the handling elements (43) can also be designed so that a contact is provided with transport elements, which in turn carry the preforms (1) or containers (2). Such a transport element can be designed, for example, as a transport mandrel (9), on which the preforms (1) are shoved or into which the preforms (1) are introduced by their mouth region.

FIG. 5 shows how two cam tracks (49, 50) are used to control the positioning movements of the carrier elements (42), being arranged one above the other in the vertical direction. The carrier arms (44) are fastened by swivel joints (51) to a central element (52) of the transfer wheel (41). In the area of the swivel joints (51), the carrier arms (44) have transverse levers (53), which are guided along the cam track (49) by a cam roller (54). In this way, swivel movements of the carrier arms (44) are dictated by a rotation of the central element (52). In the sample embodiment shown, the cam rollers (54) are guided along the cam track (49) on the inside.

The carrier arms (44) are telescopic and guided along the cam track (50) by means of a cam roller (55) in order to dictate a telescopic movement of the carrier arm (44). In the sample embodiment shown, the cam roller (55) is also guided along the cam track (50) on the inside. In a typical work sequence, the transfer wheel (41) rotates about its pivot axis (56).

Figure 6:
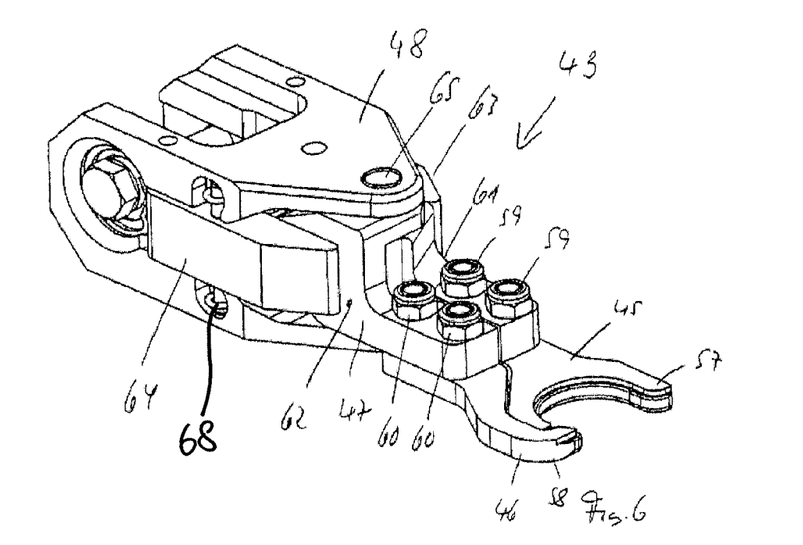

FIG. 6 illustrates in a perspective representation the design of the base element (48) and the tong base (47) with the tong arms (45, 46). One recognizes that the tong arms (45, 46) have gripping ends (57, 58), which can be configured to partly enclose a neck region of a preform (1) or a container (2). The tong arms (45, 46) are joined by connection elements (59, 60) to the tong base (47).

It is also recognizable from FIG. 6 that mating elements (63, 64) are arranged each time next to side surfaces (61, 62) of the tong base (47). One also notices a pivot axis (65) around which the tong base (47) can swivel relative to the base element (48) against the force of at least one spring (68) (also shown in FIGS. 7-9).

In an operating condition according to FIG. 6, the tong arms (45, 46) can grasp the preform (1) or a container (2) by their gripping ends (57, 58).

Figure 7:
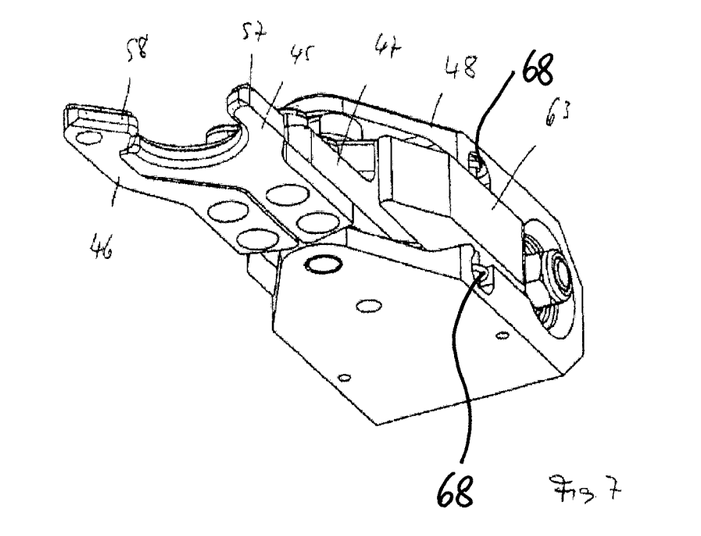

FIG. 7 shows the arrangement per FIG. 6 in a slightly modified condition of an end region of the second tong arm (46).

Figure 8:
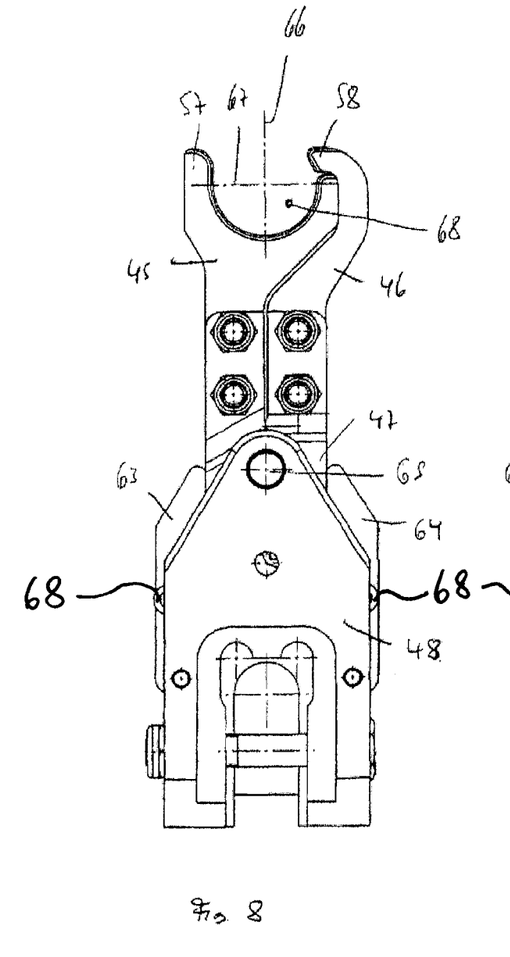

FIG. 8 shows in top view the design of the tong arms (45, 46) as well as the relation to the tong base (47) and the base element (48). To illustrate the geometrical relationships, a central line (66) and a transverse central line (67) have been drawn. For an arrangement of the carrier elements (42) in the region of the transfer wheel (41), the central line (66) runs essentially in a radial direction of the transfer wheel (41) and the transverse central line (67) runs transverse to this radial direction.

The first tong arm (45) and the second tong arm (46) jointly delimit a workpiece holding recess (68) at least in some regions, in which the neck segment of a preform (1) or container (2) is placed during a handling process. Typically, the workpiece holding recess (68) is open in a direction pointing away from the tong base (47).

Being so characterized, FIG. 8 illustrates in particular that the first tong arm extends at least for a section on either side of the central line (66). Forces acting transverse to the central line (66) can thus be absorbed by the first tong arm (45) on either side. The second tong arm (46) delimits the workpiece holding recess (68) only in a region that lies outside the transverse central line (67) and thus faces away from the tong base (47). This prevents unwanted opening forces from being introduced into the second tong arm (46).

Figure 9:
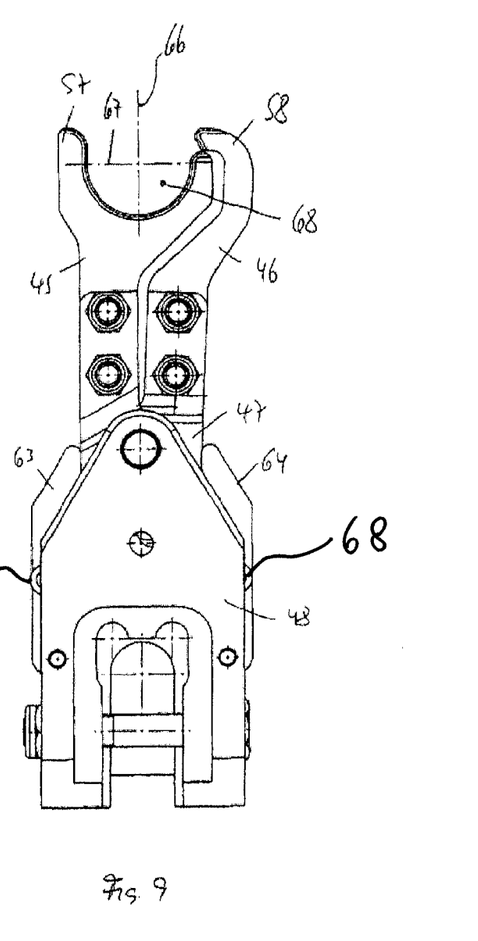

FIG. 9 shows the arrangement of FIG. 8 in an opened state of the tongs. The second tong arm (46) here has been pushed in the direction of the transverse central line (67) relative to the first tong arm (45) so that the workpiece holding recess (68) is released in a radial outwardly pointing direction. In this way, the preform (1) or the container (2) can be removed.

The opening and closing movements of the tong arms (45, 46) can occur in various ways. First, it is conceivable to use a passive control system. No special activating elements are provided for the tong arms (45, 46), but instead the preform (1) or the container (2) is pushed into the workpiece holding recess (68) from the outside and the corresponding forces result in an opening of the tong arms (45, 46) and then a locking once again. A removal of the preform (1) or the container (2) occurs in the reverse direction by applying pulling forces that act on the workpiece in a radial direction. For an assisting of such operating sequences, the second tong arm (46) has suitable guide bevels in the region of its gripping end (58).

The invention claimed is:

1. A device for holding a workpiece, said device comprising tongs that include only a first tong arm and a second tong arm, wherein the first tong arm and the second tong arm are held by a tong base such that the first tong arm and the second tong arm are arrangeable with respect to each other at least in an open position and in a closed position, wherein the tong base is arranged on a transfer wheel, wherein an opening movement between the first tong arm and the second tong arm is carried out by movement of at least one of the first tong arm and the second tong arm transverse to a radial direction of the transfer wheel, wherein the first tong arm extends on both sides of a central line at least in some regions, said central line passing through the tong base in the radial direction of the transfer wheel, wherein a workpiece holding recess, which is delimited by the first tong arm and the second tong arm at least in some regions, is delimited only by the second tong arm in a holding recess region located outside, in the radial direction of the transfer wheel, of a holding recess transverse central line that runs transverse to the central line, and wherein the tong base can swivel out from a base element against the force of at least one spring.

2. The device according to claim 1, wherein the first tong arm delimits a troughlike workpiece holding recess.

3. The device according to claim 1, wherein the first tong arm extends beyond the transverse central line in a direction facing away from the tong base at least on one side in relation to the central line.

4. The device according to claim 1, wherein the first tong arm extends beyond the transverse central line in a direction facing away from the tong base on both sides in relation to the central line.

5. The device according to claim 1, wherein the second tong arm has at least one guide surface for interacting with a workpiece.

6. The device according to claim 1, wherein the first tong arm and the second tong arm are spring loaded relative to each other.

7. The device according to claim 1, wherein at least one of the first tong arm and the second tong arm can be positioned by cam control.

* * * * *